United States Patent [19]
Marianetti, II

[11] Patent Number: 5,228,126
[45] Date of Patent: Jul. 13, 1993

[54] IMAGE DATA ACCELERATED PROCESSING APPARATUS AND METHOD

[75] Inventor: Ronald Marianetti, II, Mountain View, Calif.

[73] Assignee: Radius Inc., San Jose, Calif.

[21] Appl. No.: 638,782

[22] Filed: Jan. 8, 1991

[51] Int. Cl.⁵ .............................................. G06F 15/20
[52] U.S. Cl. ...................................... 395/162; 395/148; 395/131; 340/701; 340/703
[58] Field of Search .................. 395/131, 162, 148; 340/701, 703; 364/736

[56] References Cited
U.S. PATENT DOCUMENTS
5,068,644  10/1992  Batson et al. .................. 340/703

OTHER PUBLICATIONS
"JPEG Still Picture Compression Algorithm", JPEG-8-R8, Aug. 14, 1990.

Primary Examiner—Dale M. Shaw
Assistant Examiner—Kee M. Tung
Attorney, Agent, or Firm—A. C. Smith

[57] ABSTRACT

The system and method for processing streams of coordinated data segments includes formatting the data segments into a single processing data word having a number of bits not less than the sum of the formatted data segments for common processing as a single data word in at least one clocked operating cycle.

11 Claims, 1 Drawing Sheet

# IMAGE DATA ACCELERATED PROCESSING APPARATUS AND METHOD

RELATED APPLICATIONS

The subject matter of this application is related to the subject matter of application Ser. No. 07/588,560, filed Sep. 26, 1990, now issued as U.S. Pat. No. 5,070,532, entitled "Method for Encoding Color Images".

FIELD OF THE INVENTION

This invention relates to techniques for speeding up the processing of correlated data streams and more particularly to the apparatus and method for formatting data streams for accelerated processing.

BACKGROUND OF THE INVENTION

Recent developments in the field of digital image processing have prompted adoption of techniques for the encoding and decoding, storing and telecommunications of data associated with natural color and greyscale images. One major motivation for the development of rapid digital image processing was the adoption of standard protocol for the telecommunication of images at only 64 Kilobits per second on the Integrated Services Digital Network (ISDN). Image data compression and decompression algorithms and standards were adapted by the Joint Photographic Expert Group (JPEG) that have been widely accepted in computer graphics applications as well as in image telecommunications service. In addition, graphic display techniques have been developed for producing virtual three-dimensional, computer-controlled displays and images. In these and other digital data processing applications, it has become increasingly important to rapidly process streams of correlated data for efficient storage and rapid transfer of graphic images within and between computer systems connected at different locations on a data bus or network. In graphical image processing, the applicable data may comprise the X-axis and Y-axis and Z-axis coordinate data of a selected point on a displayable image, or may comprise the red, green, blue (R,G,B) data which defines the color characteristics of a selected point on a displayable image. Thus, to process digital data associated with complex displayable images and images of natural coloration, a great volume of digital data in correlated sets representing coordinates (X,Y,Z) or characteristics (R,G,B) of individual displayable data points must be processed rapidly in order to store or transfer or reproduce the displayable image in reasonable time and with high resolution. Thus, for large-scale images of high color or positional resolution, 8-bit to 20-bit data for each of three color characteristics or each of three positional coordinates of each displayable picture element (or, pixel) in the image would have to be processed at very high speed in order to reproduce the displayable image without objectionable delays. This has been accomplished in conventional manner by operating multiple processors in parallel on the separate streams of correlated pixel data (that is, on the stream of all R data for data points, or on all G data, or on all B data, or the like), or by operating a single processor seriatum first on the R data, then on the G data, and then on the B data for a single pixel before proceeding to process the separate color characteristic data for the next pixel. These conventional schemes tend to be more expensive for multiple processors or undesirably slow for single processors.

SUMMARY OF THE INVENTION

In accordance with the present invention, a single processor is used to process streams of coordinated or correlated data by formatting the associated color characteristic data segments representing each displayable pixel (or other plurality of coordinated data segments) to form a single data word, with optional buffer segments in the formatted data word. Such formatted data words can be processed more cheaply than with parallel processors, and can be processed three times faster (for data triplets) by a single processor than by conventional serial processing of the individual color characteristic segments of the pixel data. Initial signal processing, which may include look-up tables, formats the data segments into a data word for digital processing and subsequent signal processing, which may include look-up tables, may be used to de-format the processed data word to yield processed or modified data words.

DESCRIPTION OF THE PREFERRED EMBODIMENT

Figure 1:
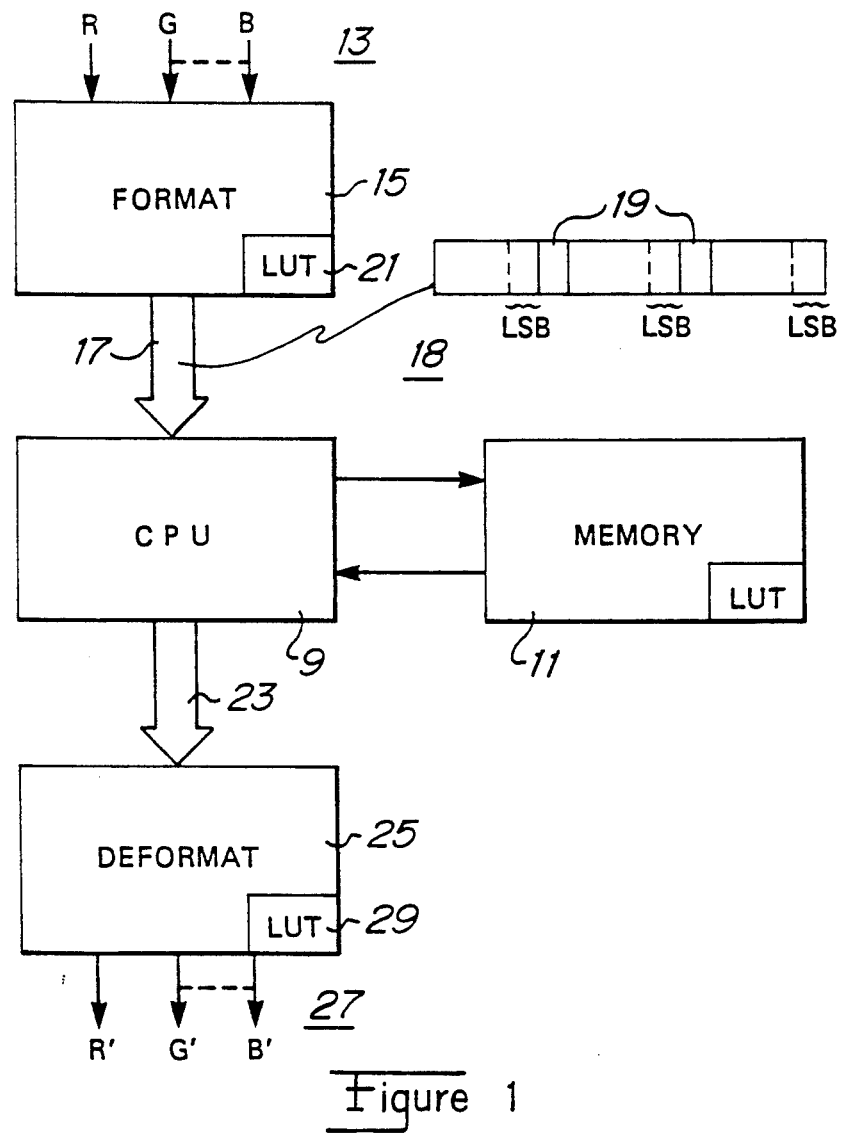
FIG. 1 is a block schematic diagram of the system for digitally processing formatted data words in accordance with the illustrated embodiment of the present invention.

Referring now to FIG. 1, there is shown a block schematic diagram of the illustrated embodiment of the present invention. Specifically, the central processing unit 9 may be a conventional computer which has capability to process 32-bit (or other length) data words in each clocked cycle of operation. Such computer may include conventional memory 11 containing operating instructions for controlling operation of the CPU 9 in conventional manner. In accordance with the present invention, typical data 13 representing, for example, the Red, Green and Blue (R,G,B) color characteristics of a displayable picture element (pixel) are received by conventional formatting circuit 15. This data represents individual streams of coordinated data for a plurality of pixels that comprise a color image which is displayable under computer control in conventional manner. The R and G and B data associated with a particular pixel are typically coordinated in that the composite data word provides the color, hue and intensity of the displayable pixel, but such data typically also appears in individual streams in that Red signal data should not affect Green display channels, and the like. Thus, each of the Red, Green and Blue signals may typically comprise 5 to 10 data bits of information per color pixel, and such individual data streams may be conventionally processed via multiple processors operating in parallel or serially on the individual R and G and B correlated data per pixel. However, in accordance with the present invention, the formatting circuit 15 receives the individual R and G and B correlated data per pixel and forms a resultant data word 17 having any one of a plurality of data-bit formats. In one embodiment, the formatting circuit 15 may include shift registers or other conventional circuitry to concatenate the individual R,G,B data bits per pixel into a single data word 18 having additional bits 19 disposed between contiguous segments of R and G and B data. In other embodiments, buffer bits 19 may be included in the least significant bit positions or most significant bit positions of the resultant data word. Also, in other embodiments, the streams of coordinated data 13 may comprise x-axis, and y-axis, and z-axis positional information for a displayable pixel in a virtual three-dimensional image display, and such data may be formatted by conventional conversion techniques, for example, to polar coordinate data segments of a resultant data word 18. For these purposes, format circuit 15 may include a look-up table 21 in memory to facilitate the rapid formatting in conventional manner, for example, of x, y, and z Cartesian coordinate positional information into polar coordinate equivalents of position per individual displayable pixel.

The central processing unit 9 receives the formatted resultant data word 17 of, say, 32-bit word length for operation thereon in at least one clocked operating cycle that thereby processes two or more segments of coordinated data simultaneously. Such clocked operations may include data word comparisons, or pixel averaging, or Huffman encoding, or color conversion or data simulation, or other software operations under conventional control of instructions from memory 11. The resultant processed data word 23 may comprise scrambled segments of the initial coordinated input data 13 (depending upon the operations thereon in CPU 9) that therefore requires deformatting in deformat circuit 25. The deformatting circuit 25 may include shift registers or other conventional circuitry for selectively restoring the individual, processed data streams 27, and in another embodiment may include look-up tables 29 in memory to facilitate rapid conversion in conventional manner from scrambled, data words 23 to individual coordinated data segments 27. Thus, the rate at which two or more individual streams of coordinated data may be processed by a single CPU may be increased by a factor of three, degraded to some extent by formatting and deformatting operations 15, 25. Thus, the processing of data words according to the present invention can be advantageously used for complex software operations of CPU 9 on data words 17, and the overall processing interval may only be slightly degraded from multi-fold increases in data processing rates by the formatting and deformatting operations which may only constitute small portions of the overall processing interval. Also, the deformatting of processed data words may be unnecessary, or may constitute a portion of following signal processing circuitry, for example, in applications where the processed data words 23 are transmitted or transferred to other processing circuitry. Also, the composite may be stored for later reproduction as multiple processed data words 23 (or as deformatted data segments 27.)

Figure 2:
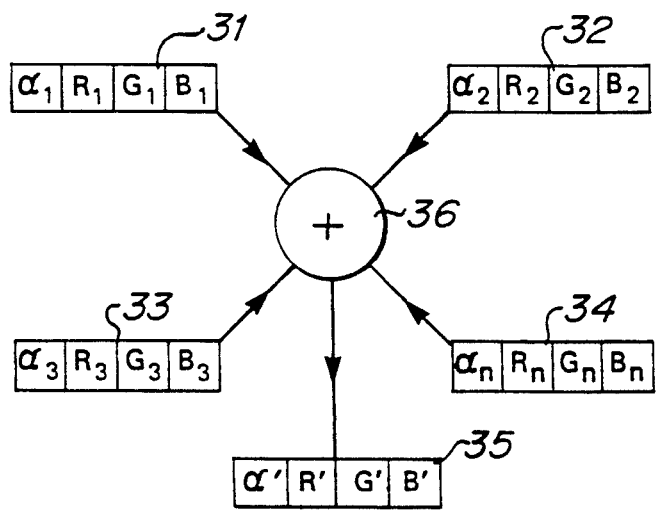
FIG. 2 is a pictorial illustration of a typical arithmetic operation on pixel data to illustrate typical operations of the embodiment of FIG. 1.

It should be recognized that two or more segments of coordinated digital data may be processed according to the present invention for enhanced rates of data processing by a single central processing unit 9. As illustrated in the pictorial diagram of FIG. 2, there is shown an example of four blocks of digital data 31–34, each including multiple bits of R,G,B (and $\alpha$) data and each representing individual color pixels of a displayable image in which such pixels are oriented in contiguous relationship as displayed, and from which the 'average' color, hue and intensity is desired to be represented as a new block of pixel data 35 ('$\alpha$'. is illustrated as an arbitrary block of data bits or blank bits). In this example, a single processing unit would conventionally process, in selected sequence, all of the $R_{1-n}$ data bits in summation and division operations, then all of the $G_{1-n}$ data bits in similar operations, and then all of the $B_{1-n}$ data bits in similar operations (and all $\alpha$ data bits, if any) to yield 'average' pixel data 35. However, in accordance with the present invention, each such pixel data word 31–34 containing multiple segments of coordinated or correlated R, G and B data are formatted into resultant processing data words 18 for digital processing in one or more common clocked cycles of the processing unit 9. Buffer bits 19 intermediate the adjacent segments of coordinated data in the formatted processing data word 18 facilitate processing of carry-over data in arithmetic operations such as adding 36, or multiplying, on streams of coordinated data in selected segments (e.g. Green). Alternatively, in formatting processing data words 17, one or more of the least significant bits (LSB) of the initial data word may be deleted to provide carry-over or buffer bits between adjacent segments of coordinated data. Of course, blank or buffer bits may also be provided at other bit positions (e.g. the most significant bits — MSB) of the processing data word where the formatting function 15 determines the requirement for carry-over bits at such positions.

Therefore, the processing method and apparatus according to the present invention enhances the processing by a single processing unit of the streams of coordinated or correlated data segments by formatting the data segments into a single processing data word that can then be processed in at least one common clocked operating cycle of the processing unit.

I claim:

1. A method for processing a plurality of digital data words in a digital processor which operates in clocked cycles of operation, wherein each of the digital data words includes a predetermined number of data bits forming a plural number of segments of coordinated data, the method comprising the steps of:

selectively formatting a plurality of digital data words to form a processing data word having a number of data bits at least equal to the sum of the number of data bits in the plurality of digital data words;

performing a data operation on the processing data word within one common clocked cycle of operation of the digital processor to produce a resultant data word; and selectively deformatting the resultant data word to provide a plurality of modified digital data words, each including said predetermined number of data bits forming said plural number of segments of coordinated data.

2. The method according to claim 1 wherein said plural number of segments of coordinated data represent selected characteristics of a displayable picture element, and wherein said step of selectively formatting includes concatenating the plurality of digital data words in selected sequence to form said processing data word.

3. The method according to claim 1 wherein said plural number of segments of coordinated data represent red, green and blue (R,G,B) signal information about a displayable picture element, and said processing data word includes said R,G, and B segments of coordinated data in concatenated configuration with optional excess data bits disposed intermediate adjacent segments.

4. The method according to claim 1 wherein said plural number of segments of coordinated data represents three orthogonal coordinates of positional information of a displayable picture element.

5. The method according to claim 1 wherein the step of formatting includes look-up table conversion of digital data words to said processing data word.

6. The method according to claim 1 wherein said step of deformatting includes look-up table conversion of the resultant data word to provide said plurality of modified digital data words.

7. Apparatus including digital processor which operates in clocked cycles of operation for processing a plurality of digital data words, wherein each of the digital data words includes a predetermined number of data bits forming a plural number of segments of coordinated data, the apparatus comprising:

means coupled to receive a plurality of digital data words for selectively formatting therefrom a processing data word having a number of data bits at least equal to the sum of the number of data bits in the plurality of digital data words;

means operating the digital processor for performing a data operation on the processing data word within one common clocked cycle of operation of the digital processor to produce a resultant data word therefrom; and means coupled to receive the resultant data word from the digital processor for selectively deformatting resultant data words received thereby to provide a plurality of modified digital data words, each including said predetermined number of data bits forming said plural number of segments of coordinated data.

8. Apparatus according to claim 7 wherein said plural number of segments of coordinated data represent red, green and blue (R,G,B) signal information about a displayable picture element; and said means for formatting concatenates said R, G, and B segments of coordinated data in concatenated configuration with at least one excess data bit disposed intermediate adjacent segments.

9. Apparatus according to claim 7 wherein said plural number of segments of coordinated data represents three orthogonal coordinates of positional information of a displayable picture element; and said means for formatting concatenates said orthogonal coordinates of positional information in concatenated configuration with at least one excess data bit disposed intermediate adjacent segments.

10. Apparatus according to claim 7 wherein said means for formatting includes a look-up table for converting said digital data words to said processing data word.

11. Apparatus according to claim 7 wherein said means for deformatting includes a look-up table for converting the resultant data word to provide said plurality of modified digital data words.

* * * * *